United States Patent [19]

Fancher

[11] Patent Number: 4,987,756
[45] Date of Patent: Jan. 29, 1991

[54] VEHICLE SWITCH WITH ROTATION PREVENTING MEANS

[75] Inventor: Ricky L. Fancher, Greeneville, Tenn.

[73] Assignee: Hurd Lock and Manufacturing Co., Inc., Greeneville, Tenn.

[21] Appl. No.: 292,753

[22] Filed: Jan. 3, 1989

[51] Int. Cl.⁵ .............................................. B60R 25/02
[52] U.S. Cl. ........................................ 70/186; 70/252
[58] Field of Search ........................... 70/185, 186, 252

[56] References Cited

U.S. PATENT DOCUMENTS

| | | | |
|---|---|---|---|
| 1,512,809 | 8/1924 | Neiman . | |
| 3,650,131 | 3/1972 | Eichenauer | 70/252 |
| 3,673,829 | 7/1972 | Mizuno | 70/252 |
| 3,782,145 | 1/1974 | Wolter | 70/186 |
| 3,828,594 | 8/1974 | Yamamoto | 70/252 |
| 3,940,958 | 3/1976 | Kuroki | 70/186 |
| 4,179,908 | 12/1979 | Schaumburg | 70/185 |
| 4,276,761 | 7/1981 | Eichenauer | 70/252 |
| 4,301,728 | 11/1981 | Jaffe et al. | 101/220 |
| 4,309,882 | 1/1982 | Moiocco | 70/186 |
| 4,414,830 | 11/1983 | Maiocco | 70/252 |
| 4,425,770 | 1/1984 | Mentani et al. | 70/252 |
| 4,487,042 | 12/1984 | Mochida et al. | 70/186 |
| 4,516,415 | 5/1985 | Kobayashi et al. | 70/252 |
| 4,771,619 | 9/1988 | Shiramizu et al. | 70/186 |
| 4,884,423 | 12/1989 | Fancher | 70/252 X |

Primary Examiner—Robert L. Wolfe
Assistant Examiner—Suzanne L. Dino
Attorney, Agent, or Firm—Luedeka, Hodges & Neely

[57] ABSTRACT

A key-manipulatable switch for a motor vehicle ignition system having a housing and a cylinder mounted within the housing for rotational and axial movement with respect thereto includes cooperating components which prevent the rotation of the cylinder counterclockwise from a first rotational position to a second rotational position unless the cylinder is in a preselected axial position with respect to the housing while permitting unrestricted clockwise rotation of the cylinder to any of several rotational positions. In one embodiment, the cylinder includes a spring-biased stop member which cooperates with a lug-like projection defined by the housing.

19 Claims, 3 Drawing Sheets

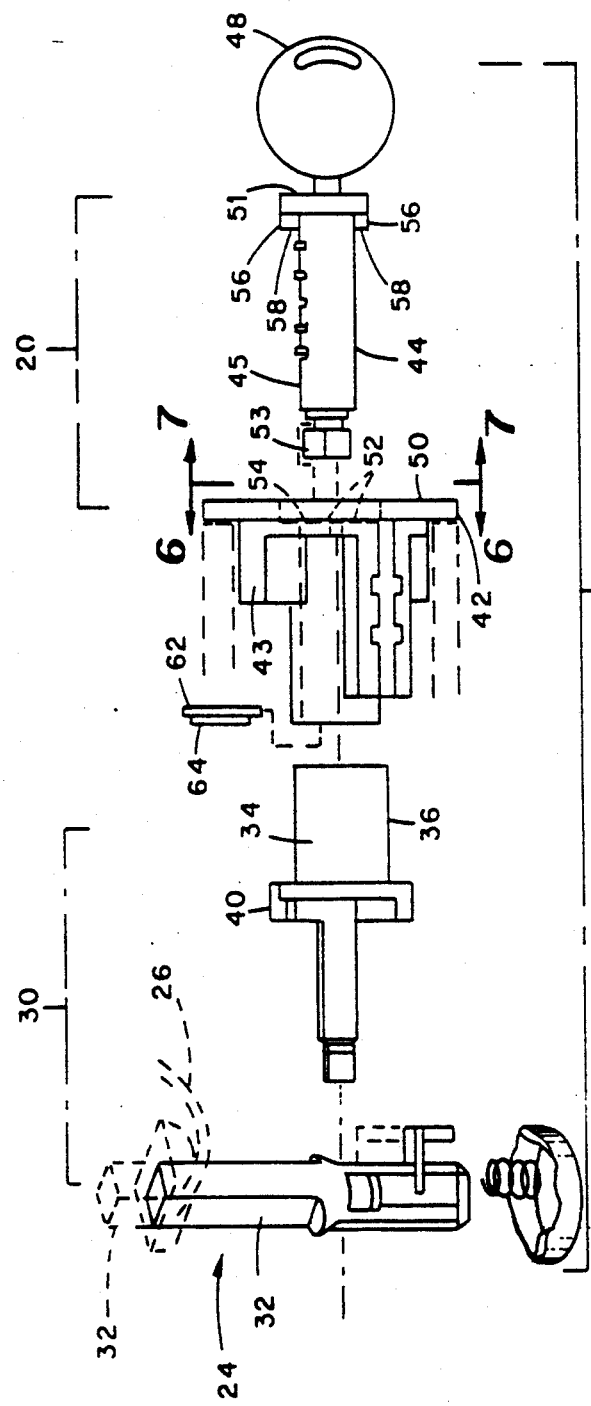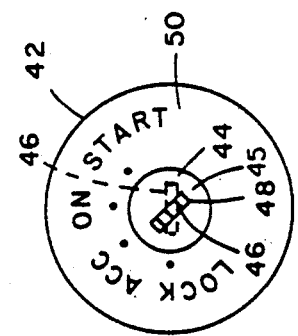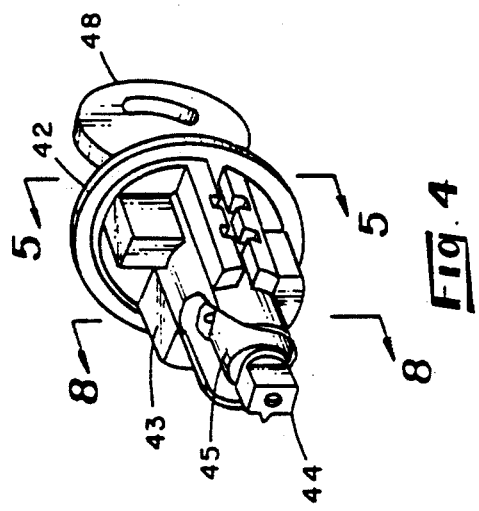

VEHICLE SWITCH WITH ROTATION PREVENTING MEANS

This invention relates generally to key-manipulatable switches for use in the ignition system of a motor vehicle and more particularly to such a switch of the type commonly used in connection with steering lock assemblies of vehicles.

Steering lock assemblies of vehicles commonly utilize key-manipulatable switches of a widely-known type having a housing and a cylinder mounted within the housing for rotation relative thereto between several rotational positions. Each rotational position commonly corresponds with an operating mode of the switch such as, for example, LOCK, ACCESSORY, ON, or START modes. Switches having such a housing and cylinder are also known that require an axial displacement of the cylinder between a first axial position to a second axial position before the cylinder can be moved between preselected ones of its rotational positions within the housing. For example, before the cylinder of a switch having the aforementioned modes can be returned from the ACCESSORY mode at which the steering wheel is in an unlocked condition to its LOCK mode at which the steering lock assembly locks the steering wheel in place, the cylinder may first be required to be axially moved from a first axial position to a second axial position. Such switches are advantageous for safety reasons in that two deliberate actions (i.e., the first being the axial movement of the cylinder and the second being the rotational movement of the cylinder) are required to manipulate the cylinder from a first, non-LOCK, position to a second, LOCK, position thereby reducing likelihood that the switch will be inadvertently moved to its LOCK mode.

It is an object of the present invention to provide a new and improved key-manipulatable switch of the aforedescribed type.

Another object of the present invention is to provide a switch of the described type having improved means for selectively limiting the movement of its cylinder between rotational positions.

Yet another object of the present invention is to provide such a switch which is uncomplicated in construction and effective in operation.

This invention resides in a key-manipulatable switch for a motor vehicle comprising a housing and a cylinder mounted within the housing for rotational movement relative thereto between several rotational positions and for axial movement within the housing between first and second axial positions.

In the present switch there is provided stop means associated with one of the cylinder and housing and means associated with the other of the cylinder and housing which is cooperable with the stop means to prevent counterclockwise rotational movement of the cylinder from a selected first rotational position to a second rotational position while permitting relatively unlimited clockwise rotation of the cylinder when the cylinder is positioned in a first axial position and to permit counterclockwise rotational movement of the cylinder when the cylinder is positioned in the second axial position.

BRIEF DESCRIPTION OF THE DRAWINGS

FIG. 3 is an elevational view, shown exploded, of components of the FIG. 1 steering lock assembly.

FIG. 4 is a perspective view of the switch of the FIG. 1 steering lock assembly.

FIG. 5 is a cross-sectional view taken approximately along line 5—5 of FIG. 4.

FIG. 12 is an exploded perspective view of the switch of the FIG. 1 steering lock assembly.

FIG. 13 is a cross sectional view taken along line 13—13 of FIG. 12.

Figure 1:
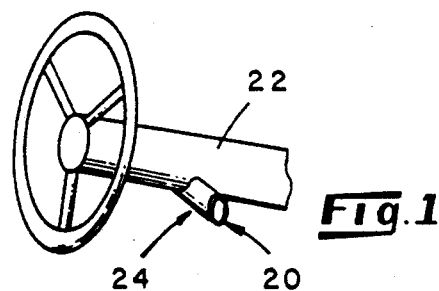
FIG. 1 is a perspective view of a motor vehicle steering column and steering lock assembly including a switch in accordance with the present invention.

DETAILED DESCRIPTION OF THE ILLUSTRATED EMBODIMENT:

Turning now to the drawings in greater detail and considering first FIG. 1, there is shown a motor vehicle (e.g., an automobile) environment within which a switch, generally indicated 20, in accordance with the present invention is operatively utilized. More specifically, the vehicle environment includes a steering wheel column 22 and a steering lock assembly 24 mounted within the steering wheel column 22. The switch 20 is, in turn, mounted within the steering lock assembly 24 and is operatively connected to the ignition system of the vehicle so as to operate as the vehicle ignition switch and so that each of its switch modes corresponds to an operating mode of the switch 20. As is described herein, the switch 20 includes means for preventing movement between preselected switch modes before the occurrence of a predetermined event.

Figure 2:
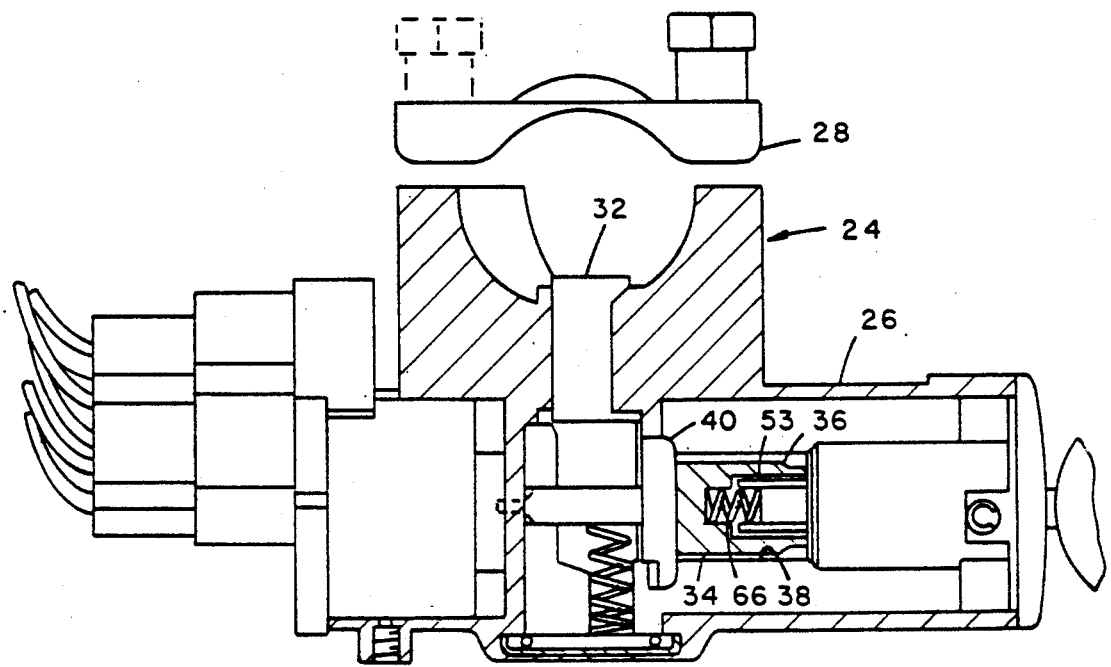
FIG. 2 is an elevational view, shown partially in section, of the steering lock assembly of FIG. 1.

With reference to FIGS. 2 and 3, the steering lock assembly 24 includes a hollow casing 26 and a clamping arrangement 28 for clamping the assembly 24 about a splined steering shaft (not shown) extending through the steering column 22 so that the assembly 24 remains stationary with respect to the column 22 as the steering wheel shaft of the vehicle is turned. The steering lock assembly 24 further includes a latch bolt assembly 30 mounted within the casing 26 for cooperating with the splines of the steering shaft for selectively locking and unlocking the position of the steering shaft within the steering column 22 as the switch 20 is moved between preselected switch modes. In this connection, the latch bolt assembly 30 includes a spring biased latch bolt 32 mounted for reciprocating movement relative to the casing 26 between a raised position, illustrated in phantom in FIG. 3, at which the bolt 32 is received by a spline of the steering shaft for locking the shaft in position and a lowered position, illustrated in solid lines in FIG. 3, at which the bolt 32 is retracted from the steering shaft spline so as to permit the steering shaft to be rotated.

The latch bolt assembly 30 further includes an elongated rotational member 34 mounted for rotational movement about its longitudinal axis within the casing 26. One end 36, or the right end as illustrated in FIG. 2, of the rotational member 34 defines a recess 38 (FIG. 1) opening axially of the member 36 and includes a camming section 40 which is responsible for moving the latch bolt 32 between its raised and lowered positions as the switch 20 is moved between the preselected switch modes. For a more detailed description of the steering lock assembly 24, reference may be had to co-pending patent application Ser. No. 216,878, filed July 7, 1988, and entitled VEHICLE LOCK ASSEMBLY OPERABLE WITH TRANSMISSION SHIFTER AND METHOD which disclosure is incorporated herein by reference.

With reference to FIGS. 3-5, the switch 20 includes a housing 42 having a main body portion 43 which is received by the cavity of the casing 26 and a key-operated cylinder 44 operatively mounted within the housing 42 for rotation relative thereto. The cylinder 44 includes a core body 45 defining a keyway slot 46 opening outwardly of one end thereof for receiving a key 48. In the depicted switch embodiment 20, the cylinder 44 of the switch 20 is rotatable relative to the housing 58 between one rotational position corresponding to a LOCK mode and three rotational (i.e., non-LOCK) positions corresponding in sequence to ACCESSORY, ON and START modes. Indicia markings denoting the aforementioned switch modes are borne by the exposed end face 50 of the housing 42, as best shown in FIG. 5, and when the cylinder 44 is positioned in any one of the aforedescribed switch modes, the keyway slot 46 aligns with the corresponding indicia marking.

The switch 20 is further characterized in that when the cylinder 44 is positioned in the ACCESSORY mode, the cylinder 44 is capable of being moved axially relative to and along the length of the housing 42 between a first axial position at which one end 51, or the right end as shown in FIG. 3, of the cylinder 44 is flush with the face 50 of the housing 42 and a second axial position at which the cylinder end 51 is recessed inwardly from the plane of the face 50. To this end and with reference to FIGS. 6 and 7, the housing 42 includes axially-directed projections 52 defining rightwardly-facing (as viewed in FIG. 3) planar shoulders 54, shown cross-hatched in FIG. 6 for purposes of understanding, and the cylinder 44 includes axially-directed projections 56 defining leftwardly-facing (as viewed in FIG. 3) planar shoulders 58. The housing projections 52 and cylinder projections 56 are so shaped that when the cylinder 44 is positioned in either of the LOCK, ON or START modes, the shoulders 54 and 58 abut one another so as to maintain the cylinder 44 in its first axial position, and when the switch 20 is positioned in its ACCESSORY mode, the projections 54 and 58 intermesh so as to permit axial movement of the cylinder 44 between the first and second axial positions.

Figure 6:
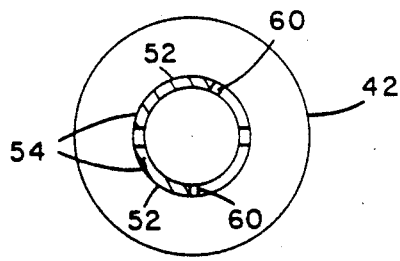
FIG. 6 is an end elevational view of the switch housing as viewed along line 6—6 of FIG. 3.
Figure 7:
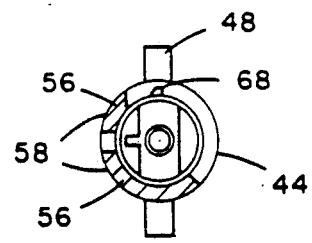
FIG. 7 is an end elevational view of the switch cylinder as viewed along line 7—7 of FIG. 3.

With reference still to FIG. 6, the housing 42 defines camming surfaces 60, 61 adjacent a corresponding edge of the housing shoulders 54 which are sloped so that forced rotational movement of the cylinder 44 from the ACCESSORY mode toward either of the LOCK or ON modes guides the cylinder 44 from its second to its first axial position. Axial displacement of the cylinder 44 is confined between the first and second axial positions by the cooperation between the cylinder 44 and housing 42 at the projections 58 and 54 thereof and a washer 62 (FIG. 3) and retaining ring 64 secured about the end, indicated 53, of the cylinder 44 opposite the end 51 thereof.

With reference again to FIGS. 2 and 3, the cylinder end 53 is shaped so as to be received by and keyed within the recess 38 defined in the end 36 of the rotational member 34 so that rotational movement of the cylinder 44 relative to the housing 42 moves the rotational member 34 about its longitudinal axis by a corresponding amount. Furthermore, the cylinder end 53 is recessed so as to receive one end of a spring 66 interposed between the cylinder 44 and rotational member 34 as shown in FIG. 3. The compression spring 66 operates to bias the cylinder 44 from its second axial position toward its first axial position so that when the switch 20 is positioned within its ACCESSORY mode, the cylinder 44 is normally positioned in its first axial position by the biasing force of the spring 66.

Figure 8:
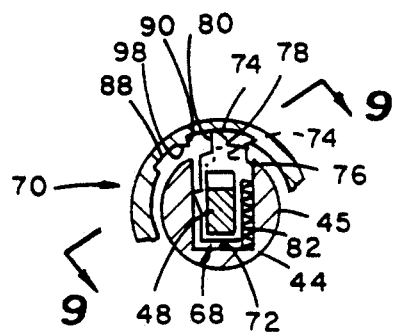
FIG. 8 is a cross-sectional view taken about on line 8—8 of FIG. 4.

In accordance with the present invention and with reference to FIG. 8, the cylinder 44 includes a stop member 68 and the housing 42 includes means, generally indicated 70, for cooperating with the stop member 68 to prevent the counterclockwise rotational movement of the cylinder 44 from the ACCESSORY mode position to the LOCK mode position when the cylinder 44 is in the first axial position and permit substantially unrestricted clockwise rotation of the cylinder 44 from the LOCK mode position. In the depicted switch embodiment 20, the cylinder core body 45 defines an elongated recess 72 in its cylindrical surface, and the stop member 68 is in the form of a somewhat rectangularly-shaped ring having an elongated opening through which the key 48 is adapted to pass. Moreover, the stop member 68 defines a camming tab 74 at the top thereof, as viewed in FIG. 8, and defines a shoulder 76 extending from one side thereof. The camming tab 74 defines a sloped camming surface 78 extending along one side thereof and a generally straight abutment surface 80 opposite the camming surface 78, which abutment surface 80 is oriented generally perpendicular to the rotational axis of the cylinder 44.

The stop member 68 is movable along the length of the recess 72 between an extended condition as shown in solid lines in FIG. 8 at which the tab 74 extends outwardly of the cylindrical surface of the core body and a retracted condition as shown in phantom in FIG. 8 at which the tab 74 is withdrawn within the recess 72. Furthermore, the stop member 68 is spring-biased from its retracted condition toward its extended condition by means of a compression spring 82 interposed between the shoulder 76 and the bottom of the recess 72.

With reference to FIGS. 8-13, the cooperating means 70 of the housing 42 includes means defining a pair of axially-opening notches or cutouts 84, 86 in a radial section of its body so that a lug portion 88 is provided between the cutouts 84, 86. The cutout 84 defines two opposite sides 90 and 92 and a guide surface 94 extending between the cutout sides 90 and 92. The cutout 86 defines two opposite sides 96, 98 and a guide surface 100 extending between the cutout sides 96 and 98. The lug portion 88 terminates at an end 102 and defines two opposite sides provided by cutout sides 90 and 98. As best shown in FIG. 8, the lug side 90 is generally planar and oriented in a plane containing the rotational axis of the cylinder 44, and the lug side 98 is sloped as shown. Furthermore, each of the lug sides 90 and 98 extend between a corresponding one of the cutout guide surfaces 94 or 100 and the lug end 102.

Figure 9:
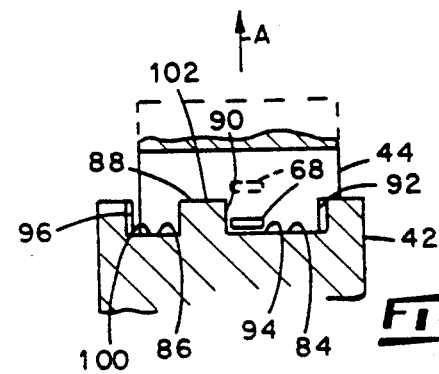
FIG. 9 is a fragmentary cross-sectional view taken about on line 9—9 of FIG. 8 illustrating the position of the cylinder wherein its ACCESSORY mode position.

With the cylinder 44 positioned in the ACCESSORY switch mode portion and the first axial position as illustrated in solid lines in FIG. 9, the stop member 68 is in its extended condition and its camming tab 74 is positioned within the cutout 84. For movement of the cylinder 44 from its ACCESSORY mode position, as shown in solid lines in FIG. 9, to its LOCK mode position as shown in phantom in FIG. 10, the stop member 68 must be moved past the lug portion 88 so that its tab 74 is positioned within the cutout 86. It follows, however, that when the cylinder 44 is rotatably urged toward the LOCK mode position when in the first axial position, the abutment surface 80 engages the lug portion side 90 so that movement of the cylinder 44 to the LOCK mode position is prevented. Hence, the cooperation between the stop member 68 and the lug portion 88 prevents the counterclockwise movement of the cylinder 44 from the ACCESSORY mode position to the LOCK mode position while the cylinder 44 is in the first axial position.

In order to rotate the cylinder 44 to the LOCK mode position from the ACCESSORY mode position, the cylinder 44 is initially and bodily shifted from its first axial position, as illustrated in solid lines in FIG. 9, to its second axial position, as illustrated in phantom in FIG. 9, in the direction of the arrow A. When the cylinder 44 is positioned in its second axial position, the stop member 68 is positioned beyond the end 102 of the lug portion 88 so that counterclockwise rotational movement of the cylinder 44 toward the LOCK mode position is not limited by the lug portion 88. Once the stop member 68 clears the lug portion 88 as illustrated in solid lines in FIG. 10, continued counterclockwise rotational movement of the cylinder 44 in the direction of the arrow B (FIG. 10) effects a shifting of the cylinder 44, by means of the sliding movement of the cylinder shoulders 58 (FIG. 7) across the camming surface 60 (FIG. 6) of the housing 42, from its second axial position to its first axial position, as shown in phantom in FIG. 10, so that the stop member 68 is positioned within the cutout 86 and so that the cylinder shoulders 58 abut the housing shoulders 54. With the shoulders 58 and 54 abutting one another as aforedescribed, the cylinder 44 is positioned in its LOCK mode position and is prevented from being moved by the shoulders axially of the housing 42 to its second axial position.

Figure 10:
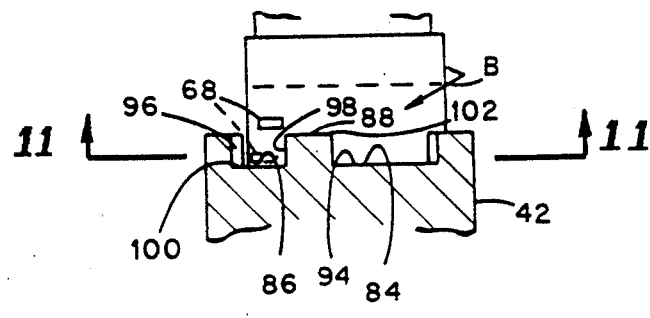
FIG. 10 is a view similar to that of FIG. 9 illustrating the position of the cylinder when in its LOCK mode position.
Figure 11:
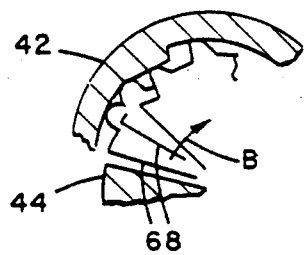
FIG. 11 is a fragmentary cross-sectional view taken about on line 11—11 of FIG. 10 illustrating sequential conditions of the stop member when the cylinder is rotated from its LOCK to its ACCESSORY mode position.

To rotate the cylinder 44 from its LOCK mode position, as illustrated in phantom in FIG. 10, to its ACCESSORY mode position, as illustrated in solid lines in FIG. 9, the cylinder 44 is simply rotated clockwise as viewed in FIG. 11. During the aforedescribed rotation of the cylinder 44 and as shown by the sequence of positions of the stop member 68 illustrated in FIG. 11, the sloped side 98 of the lug portion 88 and the camming tab 74 of the stop member 68 act as cam and cam follower, respectively, to move the stop member 68 toward its retracted condition as the tab 74 slides along the lug portion side 88. When the tab 74 passes the lug side 90, the stop member 68 is permitted to return to its extended condition. It follows that the lug portion 88 does not limit the clockwise rotational movement of the cylinder 44 from the LOCK to the ACCESSORY mode position.

The cutout 84 is sized so that the clockwise rotational movement of the cylinder 44 from the ACCESSORY toward the ON and START mode positions is not limited by the surfaces of the cutout 84. Moreover, the camming surface 61 (FIG. 6) of the housing 42 is located so that forced clockwise rotational movement of the cylinder 44 from its ACCESSORY toward its ON mode position when the cylinder 44 is in its second axial position, or phantom-line position as shown in FIG. 9, shifts the cylinder 44 to the first axial position. Therefore, axial movement of the cylinder 44 between the first and second axial positions is permitted only when the cylinder 44 is positioned in the ACCESSORY mode position.

The aforedescribed switch 20 is advantageous in that its stop member 68 and lug portion 88 requires that two separate actions are necessary to move the cylinder 44 from its ACCESSORY to its LOCK mode position. More specifically, the cylinder 44 must first be moved or pushed axially within the housing 42 from the first to the second axial position and then the cylinder 44 must be rotated in a counter-clockwise direction, as viewed in FIG. 8. The need for two such actions is believed to reduce the likelihood that the switch 20 will be inadvertently switched from a condition at which the steering wheel is unlocked to a condition at which the steering wheel is locked, and the safety of a vehicle utilizing the switch 20 is believed to be thereby enhanced.

Another advantage provided by the switch 20 is that its structure is believed to facilitate manufacture and construction of the switch 20. For example, the lug portion 88 can be manufactured integrally with the housing 42 so that the number of piece parts comprising the switch 20 is kept relatively low, and the stop member 68 can be easily positioned within the cylinder body 45 before insertion of the cylinder 44 within the housing 42.

It will be understood that numerous modifications and substitutions can be had to the aforedescribed embodiment 20 without departing from the spirit and scope of the invention. Accordingly, the aforedescribed embodiment is intended for the purpose of illustration and not as limitation.

What is claimed is:

1. A key-manipulatable switch for a vehicle comprising:
    a housing;
    a cylinder mounted within the housing for rotation relative thereto between a first rotational position and a second rotational position and for axial movement relative thereto between a first axial position and a second axial position when the cylinder is in said first rotational position; and
    a stop member mounted within the cylinder for movement relative thereto between an extended position and a retracted position and being biased from the retracted position to the extended position so that when the cylinder is positioned in said first axial position; said stop member is in its extended position;
    said housing having a body encircling the cylinder and including a projecting lug projecting radially inwardly toward the cylinder and disposed in such a relationship with respect to said stop member when said cylinder is positioned in said first rotational position so that when said cylinder is positioned in said first axial position and subsequently urged toward said second rotational position, said stop member abuttingly engages said lug so as to prevent the rotational movement of said cylinder to said second rotational position and so that when said cylinder is positioned in said second axial position and subsequently urged toward said second rotational position, said stop member passes to one side of so as to clear said lug and thereby permit the rotational movement of said cylinder from said first rotational position to said second rotational position so that said cylinder is rotatably movable from the first rotational position to the second rotational position when the cylinder is positioned in the first axial position to the second axial position with no rotational movement of the cylinder relative to the housing and then rotatably urging the cylinder toward the second rotational position, said stop member being cooperable with said lug so as to permit substantially unrestricted movement of said cylinder from said second rotational position to said first rotational position when said cylinder is positioned in said first axial position, said stop member adapted to move from its extended position to its retracted position in opposition to the force of the aforesaid stop member bias as said cylinder is rotated from said second rotational position to said first rotational position so that as the cylinder is rotated from said second rotational position to said first rotational position, said stop member passes radially inwardly of said lug.

2. The switch as defined in claim 1 wherein said lug and stop member are cooperatively shaped so that as said cylinder is moved from said second rotational position to said first rotational position, said lug and stop member act as cam and cam follower so that said stop member is moved by said lug from its extended position toward its retracted position.

3. The switch as defined in claim 2 wherein said cylinder includes a core body having a substantially cylindrical surface and said core body surface defines a recess therein, said stop member is positioned within said surface recess, and said switch includes a spring for acting between the core body and the stop member for urging the stop member from its retracted position to its extended position.

4. The switch as defined in claim 3 wherein said stop member includes an elongated body positioned within said recess for movement between an extended condition at which a portion of said elongated body extends out of said recess for cooperating with said lug as aforesaid and a retracted condition at which said elongated body is withdrawn within said recess.

5. The switch as defined in claim 4 wherein said core body defines a central opening therethrough for receiving a key and said central opening extends through said core body recess, and said elongated body of said stop member defines a through-aperture therein for loosely receiving the key when the key is operatively inserted within said central opening so that movement of said elongated body between its extended and retracted conditions is not limited by the key.

6. In a key-manipulatable switch having a housing and cylinder mounted within the housing for rotational movement relative thereto between first and second rotational positions wherein rotational movement of the cylinder from said first rotational position to said second rotational position requires that the cylinder be axially displaced along the length of the housing from a first axial position to a second axial position, the improvement comprising:

a stop member mounted within one of the cylinder and housing for movement relative thereto between an extended position and a retracted position and being biased from the retracted position to the extended position so that when the cylinder is in its first axial position, the stop member is in its extended position; and cooperating means associated with the other of the cylinder and housing for cooperating with said stop member when in its extended position to prevent rotational movement of the cylinder from said first rotational position to said second rotational position when the cylinder is positioned in said first axial position and to permit rotational movement of the cylinder from said first rotational position to said second rotational position, said cooperating means defining an abutment surface which is positioned in such a relationship with respect to said stop member when the cylinder is positioned in its first axial position so that when the cylinder is urged from said first rotational position toward said second rotational position, the stop member engages the abutment surface so as to limit rotational movement of the cylinder toward said second rotational position and is positioned in such a relationship with respect to said stop member when the cylinder is positioned in its second axial position so that when the cylinder is urged from said first rotational position toward said second rotational position, the stop member clears the abutment surface so that the rotational movement of the cylinder from said first rotational position to said second rotational position is not limited thereby and so that said cylinder is rotatably movable from the first rotational position to the second rotational position when the cylinder is positioned in the first axial position by first moving said cylinder from the first axial position to the second axial position with no rotational movement of the cylinder relative to the housing and the rotatably urging the cylinder toward the second rotational position, said stop member adapted to move from its extended position to its retracted position in opposition to the force of the aforesaid stop member bias as said cylinder is rotated from said second rotational position to said first rotational position so that as the cylinder is rotated from the second rotational position to the first rotational position, said stop member passes by said abutment surface.

7. The improvement of claim 6 wherein said cooperating means cooperates with said stop member for moving said stop member from its extended position to its retracted position when the cylinder is moved from said second rotational position to said first rotational position so that the aforesaid movement of the cylinder from said second rotational position to said first rotational position is not limited by the stop member.

8. The improvement of claim 6 wherein said stop member is mounted within said cylinder for movement relative thereto between extended and retracted conditions and said housing includes a body having a projecting lug providing said cooperating means, and said stop member is adapted to engage said lug and be moved from its extended position to its retracted position when the cylinder is rotated from said second rotational position to said first rotational position so that rotational movement of the cylinder from said second rotational position to said first rotational position is not limited by the cooperation between the stop member and the lug.

9. The improvement of claim 8 wherein said cylinder includes a core body having a substantially cylindrical surface and said core body surface defines a radially outwardly-opening recess, said stop member is positioned within said surface recess, and said switch includes a spring for acting between the core body and the stop member for biasing the stop member from its retracted condition to its extended condition.

10. The improvement of claim 8 wherein said lug and said stop member are cooperatively shaped so that when the cylinder is moved from said second rotational position to said first rotational position, said lug and said stop member act as cam and cam follower so that said stop member is moved by said lug from its extended to its retracted position 11. The improvement of claim 8 wherein said cylinder and housing are adapted to cooperate with one another so that as said cylinder is moved from said first rotational position to said second rotational position, said cylinder is forced to move from said second axial position to said first axial position.

12. The improvement of claim 6 wherein said cylinder and housing are adapted to cooperate with one another so that axial movement of the cylinder from said first axial position to said second axial position is prevented when said cylinder is in said second rotational position.

13. A key manipulatable switch for a vehicle comprising;
   a housing;
   a cylinder rotatably positioned within the housing and adapted to receive a key inserted therein for manual rotation of the cylinder relative to the housing between one rotational position and another rotational position, said housing and said cylinder cooperating with one another so as to permit axial movement relative tot he housing between one axial position and another axial position when the cylinder is positioned in said one rotational position;
   a stop member mounted within one of the cylinder and housing for movement relative thereto between an extended position and a retracted position and being spring-biased from the retracted position to the extended position so that when the cylinder is in said one rotational position, the stop member is in its extended position; and
   cooperating means associated with the other of the housing and cylinder defining an abutment surface which is positioned in such a relationship with respect to said stop member when the cylinder is positioned in said one axial position to said another rotational position, the stop member engages the abutment surface so as to prevent rotational movement of the cylinder to said another rotational position and is positioned in such a relationship with respect to said stop member when the cylinder is positioned in said another axial position so that when the cylinder is urged from said one rotational position toward said another rotational position, the stop member clears the abutment surface so that the rotational movement of the cylinder from said one rotational position to said another rotational position is not prevented by the stop member and abutment surface and so that said cylinder is rotatably movable from the one rotational position to the another rotational position when the cylinder is positioned in the one axial position by first moving said cylinder from the one axial position to the another axial position with no rotational movement of the cylinder relative tot he housing and then rotatably urging the cylinder toward the another rotational position,
   said stop member adapted to move from its extended position to its retracted position in opposition to the force of the aforesaid spring-bias as said cylinder is rotated from said another rotational position to said one rotational position so that as said cylinder is rotated from said another rotational position to said one rotational position, said stop member passes by said abutment surface.

14. The switch as defined in claim 13 wherein said stop member is mounted within said cylinder and the cooperating means is associated with said housing.

15. The switch as defined in claim 14 wherein said housing includes a body having a projecting lug providing said cooperating means, and said stop member is adapted to engage said lug and be moved from its extended position to its retracted position when the cylinder is rotated from said another rotational position to said one rotational position so that rotational movement of the cylinder from said another rotational position to said one rotational position is not prevented by the cooperation between the stop member and the lug.

16. The switch as defined in claim 15 wherein said cylinder includes a core body having a substantially cylindrical surface and said core body surface defines a radially outwardly-opening recess therein, said stop member is positioned within said surface recess, and said switch includes a spring for acting between the core body and the stop member for urging the stop member from its retracted position to its extended position.

17. The switch as defined in claim 16 wherein said lug and said stop member are shaped so that when the cylinder is moved from said another rotational position to said one rotational position, said lug and said stop member act as cam and cam follower so that said stop member is moved by said lug from its extended condition toward its retracted position.

18. The switch as defined in claim 13 wherein said cylinder and housing are adapted to cooperate with one another so that as the cylinder is moved from said one rotational position to said another rotational position, said cylinder is forced from said another axial position to said one axial position.

19. The switch as defined in claim 14 wherein said cylinder and housing are adapted to cooperate with one another so that movement of the cylinder between said one and another axial positions is prevented when the cylinder is in said one rotational position.

* * * * *

UNITED STATES PATENT AND TRADEMARK OFFICE
CERTIFICATE OF CORRECTION

PATENT NO. : 4,987,756

DATED : January 29, 1991

INVENTOR(S) :

It is certified that error appears in the above-identified patent and that said Letters Patent is hereby corrected as shown below:

Column 2, line 22, delete "wherein" and substitute --when in-- therefor.

Column 9, line 41, (Claim 13) delete "tot he" and substitute --to the-- therefor.

Column 9, line 56, (Claim 13) after "position" insert --so that when the cylinder is urged from said one rotational position--.

Column 10, line 12, (Claim 13) delete "tot he" and substitute --to the-- therefor.

Signed and Sealed this

Fifteenth Day of September, 1992

Attest:

DOUGLAS B. COMER

*Attesting Officer*     *Acting Commissioner of Patents and Trademarks*